H. JENSEN.
CORN PLANTER.
APPLICATION FILED APR. 23, 1913.
1,068,500.
Patented July 29, 1913.
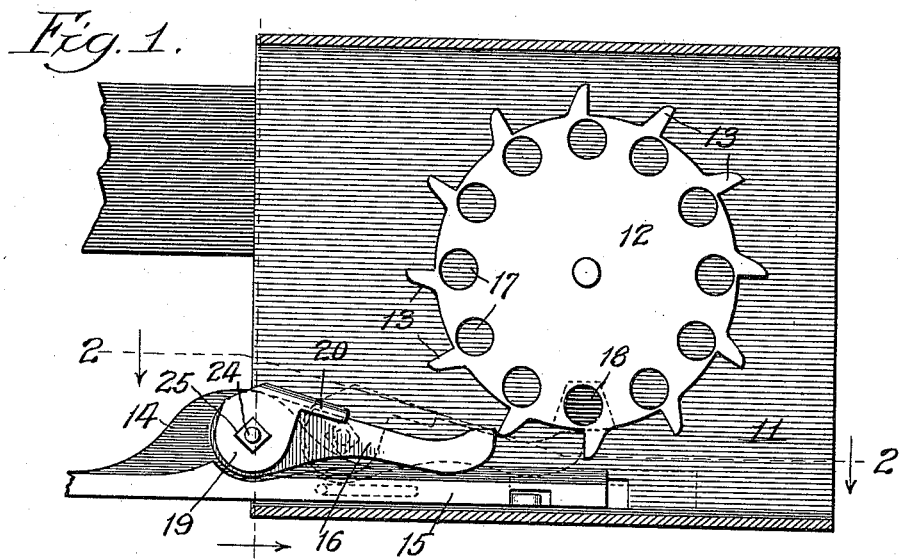
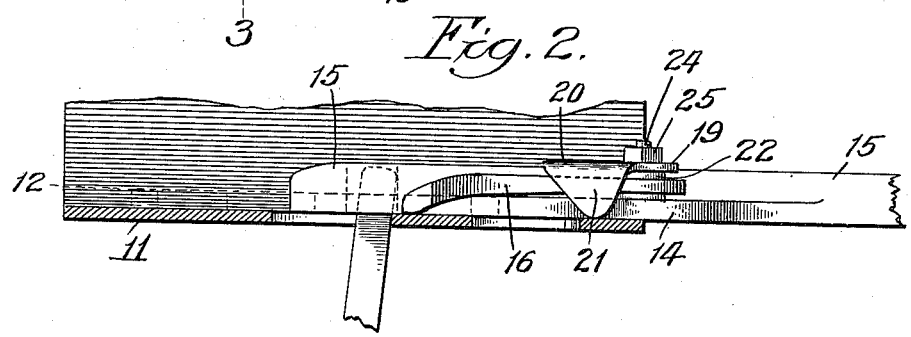
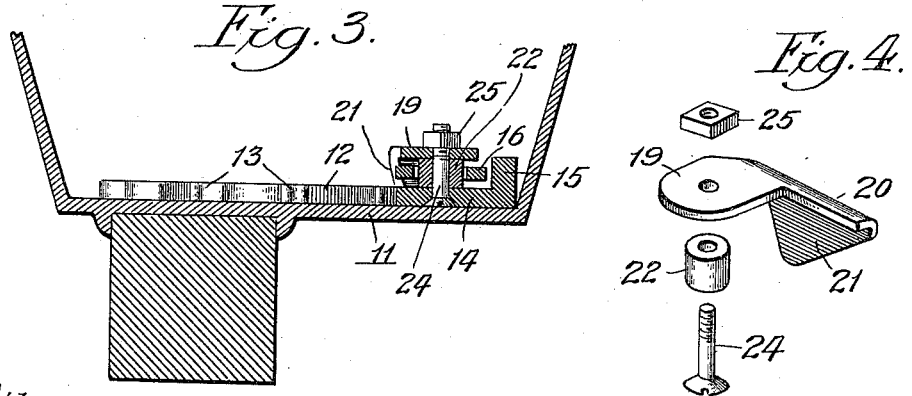
Witnesses:
John Enders
Gustav Drews
Inventor:
Harry Jensen,
by Wilfred C. Lane.
Atty.

UNITED STATES PATENT OFFICE.

HARRY JENSEN, OF WALL LAKE, IOWA.

CORN-PLANTER.

1,068,500.  Specification of Letters Patent.  Patented July 29, 1913.

Application filed April 23, 1913. Serial No. 763,030.

*To all whom it may concern:*

Be it known that I, HARRY JENSEN, a citizen of the United States, and residing at Wall Lake, in the county of Sac and State of Iowa, have invented certain new and useful Improvements in Corn-Planters, of which the following is a specification.

This invention relates to seeders and especially to corn planters in which the seed is fed simultaneously with the advance of the vehicle on which the seeder is mounted.

The pawl for operating the seed plate of the ordinary corn planter, after having engaged one of the teeth of the seed plate to advance the seed plate, returns to its initial position by sliding over the tooth or teeth next following the tooth just engaged. In practice, it has been found that the pawl before dropping from such raised position when sliding over the tooth or teeth, will frequently sway over onto the seed plate and continue to ride on such seed plate in which position, the pawl will, of course, not advance the seed plate. The vehicle containing the seeder is advancing all the time when such seed plate is not advanced and consequently there will be a stretch of ground unseeded and left useless, if the seed opening were closed by the last advance movement of the seed plate, or if the seed opening were left in open position, the seed will rush through in one continuous stream and the consequence be just as futile.

It is an object of this invention to overcome this defect of the present corn planter and to insure a regular and positive feeding of the seed. To this end, a means is provided for safe-guarding against the displacement of the pawl and thereby to insure the engagement of the pawl with the dropping plate or seed plate.

It is a further object of the invention to provide a contrivance that is inexpensive to manufacture and one that can be easily and readily fitted to the ordinary corn planter.

The simplicity and utility of the article is one of the features of this device.

The above features, and other capabilities and advantages of the invention will become apparent from a detailed description of the accompanying drawings showing a specific embodiment of the invention in which—

Figure 1 is a plan view showing a seed plate and the pawl for operating the same, the pawl being equipped with an embodiment of the present invention. Fig. 2 is a side elevation in cross-section on the line 2—2 of Fig. 1 looking in the direction of the arrows. Fig. 3 is an end elevation in cross-section on the line 3—3 of Fig. 1; and Fig. 4 is a perspective view of the improved attachment and its securing means.

In the construction shown, the seed box bottom 11 has rotatably mounted on it in the usual way, a seed plate or disk 12 having teeth 13. To one side of the seed plate 12 is provided a sliding member consisting of a short platform 14 and an elongated raised back wall member 15. A pawl 16 is mounted on said short platform 14 so that when the sliding member moves forward, the pawl will engage one of the teeth 13 to advance the seed plate 12 in order that one of the openings 17 of the plate 12 will move over the opening 18 in the bottom of the seed box to permit seed to drop through the opening thereby made. This pawl 16 is loosely mounted on the short platform 14 so that when the sliding member returns the pawl 16 to initial position, the pawl may be drawn upward over the next following tooth or teeth. On account of the back wall 15, the pawl will be prevented from being thrust away from the seed plate 12 in such return movement. The pawl 16 being loosely mounted would, however, be at liberty to slide over onto the seed plate and thus get out of operative position. To overcome this liability to displacement, the attachment now to be described has been provided.

The attachment consists of a round head 19, an extension 20 and a ledge or finger 21 bent down from the head and ledge and at right angles to the same, all in one piece. A screw 24 having the top of its head flush with the bottom of the platform 14 is passed through the platform and tubular member and extends through an opening in the head 19 of the attachment and is secured in place by a nut 25 above the head 19 of the attachment. The tubular member 22 is of greater length than the thickness of the pawl 16 and has a loose connection with the same so that the pawl 16 is permitted to swing freely up and down, thus allowing the same to rise easily and slide over the tooth or teeth when being returned to initial position. The attachment is so secured on the tubular member 22 that the ledge or finger 21 will lie in close proximity to the side of the pawl 16 by means of which ledge or finger 21, the pawl will be prevented from swinging onto the seed plate 12, and thus the displacement of the pawl in such a manner is safely guarded against.

While there is herein shown and described only one embodiment of the invention, it is to be understood that various changes and modifications may be made by those skilled in the art without departing from the scope of the invention as defined in the appended claims.

Having thus described my invention, what I claim as new and desire to secure by Letters Patent is:

1. In a corn planter, the combination of a seed plate, a sliding member, a pawl mounted to travel with said sliding member, said pawl being adapted to engage said seed plate, and an attachment to prevent said pawl from inward displacement.

2. In a corn planter having a seed plate and a pawl for engaging said seed plate, the combination of a sliding member on which said pawl is loosely mounted so that in its return movement after engagement with the teeth of the seed plate, it can rise to slide over said teeth, a back wall on said sliding member to prevent said pawl from swinging away from said seed plate, and an attachment on said pawl member to prevent said pawl from swinging inward onto the seed plate 3. An attachment for preventing a pawl from sliding onto the seed plate and riding on the same, consisting of a tubular member resting on a sliding member, a pawl secured on said tubular member, said tubular member extending a short distance above the upper side of said pawl, an angular member having a round head and a side finger adapted to lie in close proximity to the side of said pawl, and a screw passing through said sliding member, tubular member and angular member to secure them together.

4. In a corn planter, a seed plate having teeth on its periphery, a sliding member, a pawl, an opening in one end of said pawl, a tubular member adapted to pass through said opening and set on said sliding member, an attachment adapted to rest on said tubular member, said attachment having a side finger to lie in close proximity along the side of said pawl to prevent the same from sliding over onto the seed plate, and a screw passing through the sliding member, tubular member and attachment to secure them together.

5. In a device of the class described, a tubular member resting on a sliding member, a pawl having an opening in one end of the same adapted to receive said tubular member, an attachment resting on said tubular member, having a finger lying in close proximity to the side of said pawl to prevent the same from sideward displacement.

6. In a device of the class described, a tubular member resting on a sliding member, a pawl having an opening in one end of the same adapted to receive said tubular member, said opening being sufficiently large to permit said pawl to freely move up and down, an attachment resting on said tubular member having a finger lying in close proximity to the side of said pawl to prevent the same from sideward displacement.

In witness whereof, I hereunto subscribe my name to this specification in the presence of two witnesses.

HARRY JENSEN.

Witnesses:
C. M. HERRIG,
EDWARD H. GOSCH.

---

Copies of this patent may be obtained for five cents each, by addressing the "Commissioner of Patents, Washington, D. C."